United States Patent [19]

Youmans et al.

[11] Patent Number: 4,778,333
[45] Date of Patent: * Oct. 18, 1988

[54] VEHICLE TOWING AND RECOVERY APPARATUS

[76] Inventors: Gordon D. Youmans; Audrey L. Youmans, both of 17375 Hawthorne Ave., Anderson, Calif. 96007

[*] Notice: The portion of the term of this patent subsequent to Apr. 14, 2004 has been disclaimed.

[21] Appl. No.: 25,346

[22] Filed: Mar. 13, 1987

Related U.S. Application Data

[63] Continuation-in-part of Ser. No. 802,090, Nov. 27, 1985, Pat. No. 4,657,468, which is a continuation of Ser. No. 372,702, Apr. 28, 1982, abandoned.

[51] Int. Cl.4 ............................................. B60P 3/12
[52] U.S. Cl. ..................................... 414/563; 280/402
[58] Field of Search ................. 414/563; 280/402; 212/199, 202, 203, 261; 254/9 R, 124

[56] References Cited

U.S. PATENT DOCUMENTS

| | | | |
|---|---|---|---|
| 3,154,205 | 10/1964 | Gillem | 414/563 |
| 3,285,443 | 11/1966 | Gaumont | 414/563 |
| 3,434,607 | 3/1969 | Nelson | 414/563 |
| 3,458,068 | 7/1969 | Scott | 414/563 |
| 3,490,627 | 1/1970 | Goldston, Jr. | 280/402 X |
| 3,559,827 | 2/1971 | Schier | 414/563 |
| 3,690,482 | 9/1972 | Gaumont | 414/563 |
| 3,877,591 | 4/1975 | Howard | 414/563 |
| 4,265,463 | 5/1981 | Perruso | 414/563 X |
| 4,384,817 | 5/1983 | Peterson | 414/563 |
| 4,573,857 | 3/1986 | Porter, Sr. et al. | 414/563 |
| 4,629,391 | 12/1986 | Soyk et al. | 414/563 |
| 4,657,468 | 4/1987 | Youmans et al. | 414/563 |

FOREIGN PATENT DOCUMENTS

| | | | |
|---|---|---|---|
| 509829 | 1/1955 | Italy | 280/402 |
| 760688 | 11/1956 | United Kingdom | 414/563 |

*Primary Examiner*—Robert J. Spar
*Assistant Examiner*—David A. Bucci
*Attorney, Agent, or Firm*—Thomas Schneck

[57] ABSTRACT

A towing apparatus having a wheel lift assembly, a bumper assembly, a boom assembly and a sheave assembly, all of which may be utilized independently. The wheel lift assembly includes a pair of wheel cradles for receiving the wheels of a disabled vehicle. The wheel lift assembly has a horizontal towing position but the assembly is selectively pivoted into a folded highway position. The bumper assembly has a pair of bumper members, each attached to a support arm that is fixed to a vertically movable upright member at a separate pivot. The bumper assembly may be used to bumper tow a disabled vehicle. The bumper members are selectively detachable for folding the bumper assembly in a highway position. The boom assembly includes a pair of boom arms that are caused to be moved vertically in conjunction with the upright member. Each boom arm is attached at a separate pivot and, like the wheel lift assembly and the bumper assembly, the boom assembly includes members which are selectively elongatable. The sheave assembly is fixed atop the upright member and includes a pulley for receipt of a winch cable. The present invention further includes a pair of hydraulically extendable stabilizer wheels for the elimination of light front ends normally associated with the towing of heavy loads.

15 Claims, 8 Drawing Sheets

VEHICLE TOWING AND RECOVERY APPARATUS

CROSS REFERENCE TO RELATED APPLICATION

This application is a continuation-in-part of application Ser. No. 802,090, filed Nov. 27, 1985, now U.S. Pat. No. 4,657,468 which is a continuation of application Ser. No. 372,702, filed Apr. 28, 1982, now abandoned.

TECHNICAL FIELD

The invention relates generally to vehicle towing apparatus and particularly to vehicle towing apparatus which can be retrofitted to a standard pickup and flat bed trucks and the like.

BACKGROUND ART

Vehicle towing devices which may be attached to standard pickup and flat bed trucks are known. U.S. Pat. No. 3,154,205 to Gillem discloses a vehicle escorting apparatus having a bumper pad for engaging the bumper of a vehicle to be towed. U.S. Pat. Nos. 3,434,607 to Nelson and 3,690,482 to Gaumont disclose vehicle towing devices having wheel support trays which are lifted off the ground by a tow truck lift mechanism.

The prior art towing devices are typically very heavy and therefore are expensive to ship to a purchaser. Furthermore, towing devices often require a relatively great distance between the towing vehicle and the vehicle being towed, thereby resulting in poor and even dangerous handling characteristics for the towing vehicle. Attempts to negotiate tight street corners may otherwise result in contact between the towing vehicle and the vehicle in tow.

Prior art towing devices will function sufficiently for many applications but lack the versatility either to tow heavily damaged vehicles or to be utilized for special application lifts such as the towing of a motorcycle. Additionally, many towing devices are not capable of recovering a stranded vehicle from a ditch or gully.

It is an object of the present invention to provide a vehicle towing apparatus having a plurality of towing and vehicle handling means with each means being individually adjustable for a particular application.

DISCLOSURE OF THE INVENTION

The above object has been met by a towing and vehicle recovery apparatus having a wheel lift assembly for cradling and lifting the wheels of a disabled vehicle a bumper assembly for bumper towing, a boom assembly for lifting a load, and a single or double sheave assembly to be used in conjunction with a winch to recover a stranded vehicle. Each assembly includes telescoping members for quick adjustment for use in a particular application. Additionally, the present invention includes a pair of hydraulically retractable wheels for stabilization of towing vehicle handling.

The wheel lift assembly of the present invention has a lift arm that is pivotally attached to an upright member which is vertically moveable by a main hydraulic cylinder. The lift arm is attached to the lower end of the upright member for vertical movement therewith. At the end of the lift arm opposite the upright member are a pair of wheel cradles disposed for receiving the wheels of a vehicle. A crossbar extends from the midportion of the lift arm to a beam rider sleeve which is slidably fit about a mounting bar extending parallel the upright member. A locking latch fixed to the beam rider sleeve may be used to prevent downward movement of the sleeve, thereby causing the lift arm to pivot from an extended towing position to a vertical highway position when the upright member is thereafter brought downward. The wheel lift assembly further includes telescoping members and includes a locking pin for securing the lift arm in a highway position during vertical movement of the upright member.

The bumper assembly has a pair of bumper members which are releasably attached to each other. Each bumper member is pivotally coupled to a bumper support arm and, in turn, each bumper support arm is coupled to the upright member at a separate pivot point for vertical movement with the upright member. When the bumper members are attached to each other, a disabled vehicle may be engaged to the bumper assembly by means of straps and/or chains. In a detached condition the bumper members may be pivoted back against the towing vehicle to facilitate utilization of other towing assemblies.

The boom assembly includes telescoping boom arms which may be locked into different positions relative to each other by a brace arm. The boom assembly is attached to the mounting bar and may be employed for lifting of loads which may be non-vehicular.

The sheave assembly includes a pulley mounted atop the upright member. A winch cable from a winch in the rear of the towing vehicle may be laced over the sheave assembly for recovery of a stranded vehicle. Optionally, the boom arms may be brought together for securement of a second sheave so as to increase leverage The present invention includes a pair of hydraulically positioned wheels which may be lowered during towing of an especially heavy load. The wheels stabilize the handling of the towing vehicle by eliminating the light front end usually associated with the towing of heavy loads.

The various towing and vehicle handling devices of the present invention provide a truck with significant demountable rescue capability, with different devices having independent adjustments for particular applications.

BEST MODE FOR CARRYING OUT THE INVENTION

Figure 1:
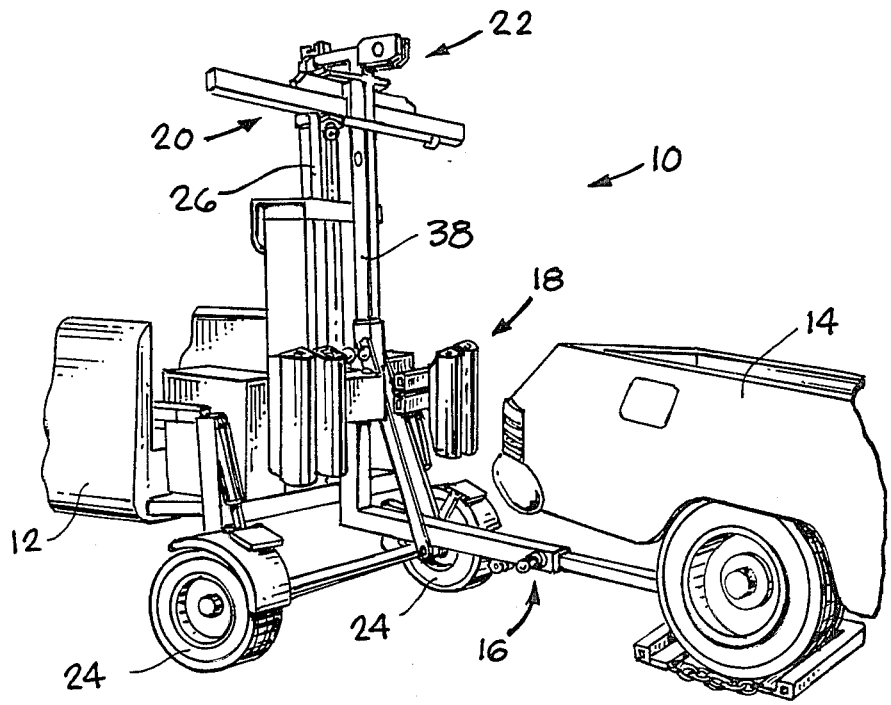
FIG. 1 is a perspective view of the present invention in operation.

With reference to FIG. 1, the towing apparatus 10 is shown attached to the rear of a towing vehicle 12. The towing vehicle is a standard pickup truck which has been retrofitted with the towing apparatus. Optionally, the towing apparatus may be installed onto a standard van or a like vehicle. The towing apparatus 10 is shown lifting the rear wheels of a disabled vehicle 14.

The towing apparatus 10 includes a wheel lift assembly 16, a separable bumper assembly 18 and a boom assembly 20. Each of the three assemblies 16, 18 and 20 may be employed in towing of a vehicle. The present invention further includes a sheave assembly 22 for recovery of a stranded vehicle and includes stabilizer wheels 24 which are hydraulically positioned for stabilization of the towing vehicle. The three towing assemblies 16, 18 and 20 are independently coupled to an upright member 26, or mast, which is raised and lowered hydraulically to provide lifting force to the towing assemblies.

Figure 2:
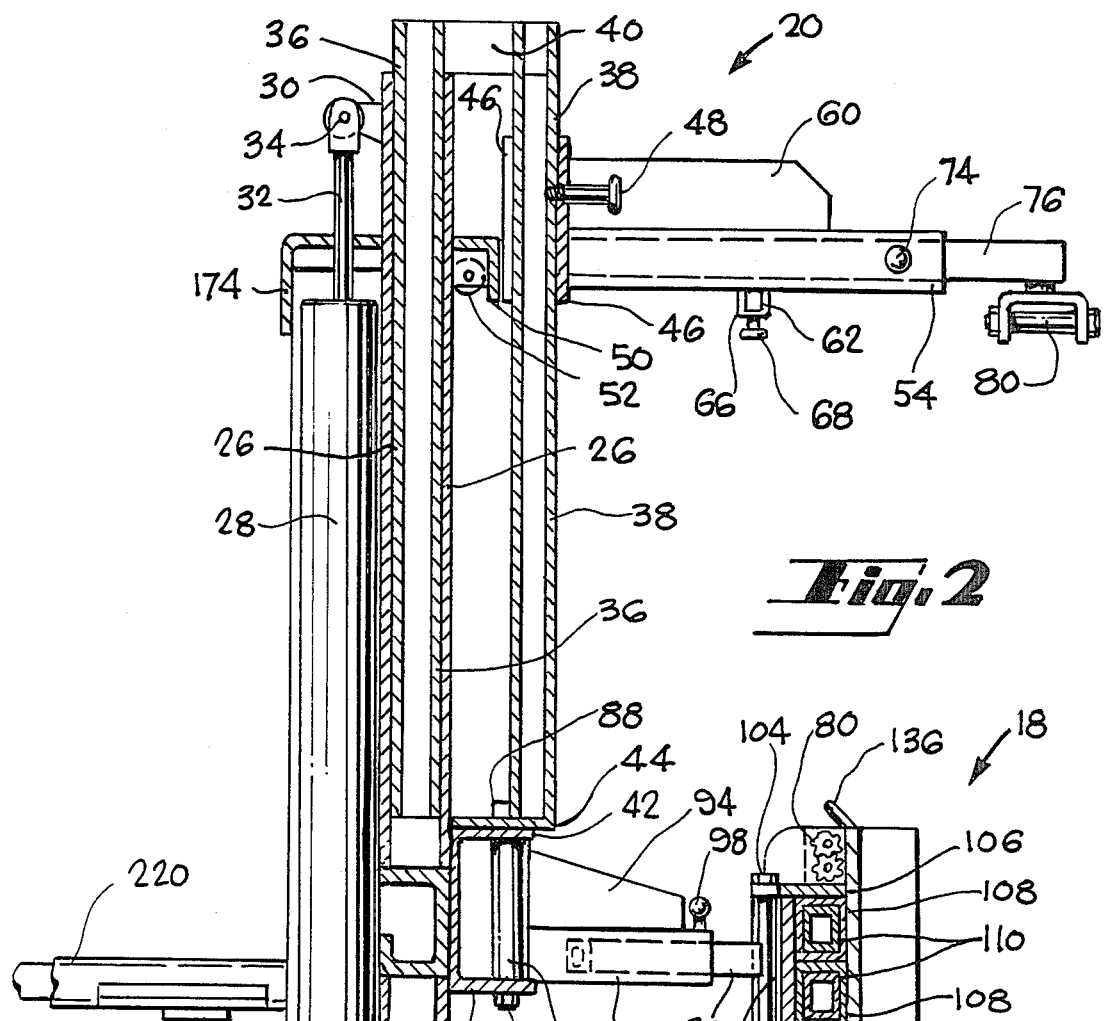
FIG. 2 is a side sectional view of the towing apparatus of FIG. 1.

Referring now to FIG. 2, the mast 26 is a hollow steel tube. For purposes of clarity, the wheel lift assembly has been omitted from FIG. 2. A main hydraulic cylinder 28 provides the lifting force for vertical movement of the mast 26. The mast has a lug 30 which is affixed to the piston rod 32 of the hydraulic cylinder by a pivot pin 34.

Hydraulic fluid originating from a fluid reservoir, not shown, enters or exists the hydraulic cylinder 28 through fitting 35 to drive the piston rod 32. Movement of the piston rod 32 is translated to the upright mast 26 by means of the lug 30.

Closely fit within the mast 26 is a rectangular rail 36. The rail 36 is slidably fit into the mast to facilitate installation of the apparatus onto a towing vehicle. The mast and the hydraulic cylinder 28 may be installed and then later the rail 36 and the assemblies associated with the rail may be easily added.

The rail 36 is connected to a mounting member 38 by ears 40. The ears 40 prevent the rail 36 from sliding into the mast 26. Extension of the piston rod 32 therefore causes vertical movement of the rail 36 and a mounting member 38 as the piston rod displaces the mast 26. Moreover, the lower end of the mounting member 38 is affixed to a C-shaped support bracket 42 that is welded to the mast 26. Thus, vertical movement of the mast is transferred to the mounting member 38 at both the upper and the lower ends of the mounting member. A foot plate 44 is utilized to support the mounting member on the bracket 42. Optionally, the foot plate and mounting member may be attached to the lower extension 43 of the bracket 42. As will be explained more fully below, with reference to FIG. 12A, a masthead 174 remains stationary during vertical movement of the mast 26. The masthead includes an inverted L-shaped portion 50 which retains a roller, as shown in FIG. 2. The roller 52 contacts the mast 26 to reduce friction during movement of the mast relative to the mast head 174.

The boom assembly 20 is connected to the mounting member 38. FIG. 2 illustrates the boom assembly as being selectively positionable on the mounting member but this is not critical as the boom assembly may even be welded to the mounting member 38. The boom assembly includes a sleeve 46 which is slidably fit over the mounting member 38. The sleeve 46 is secured into position by a T-headed pin 48 which penetrates a hole in the mounting member.

Figure 3:
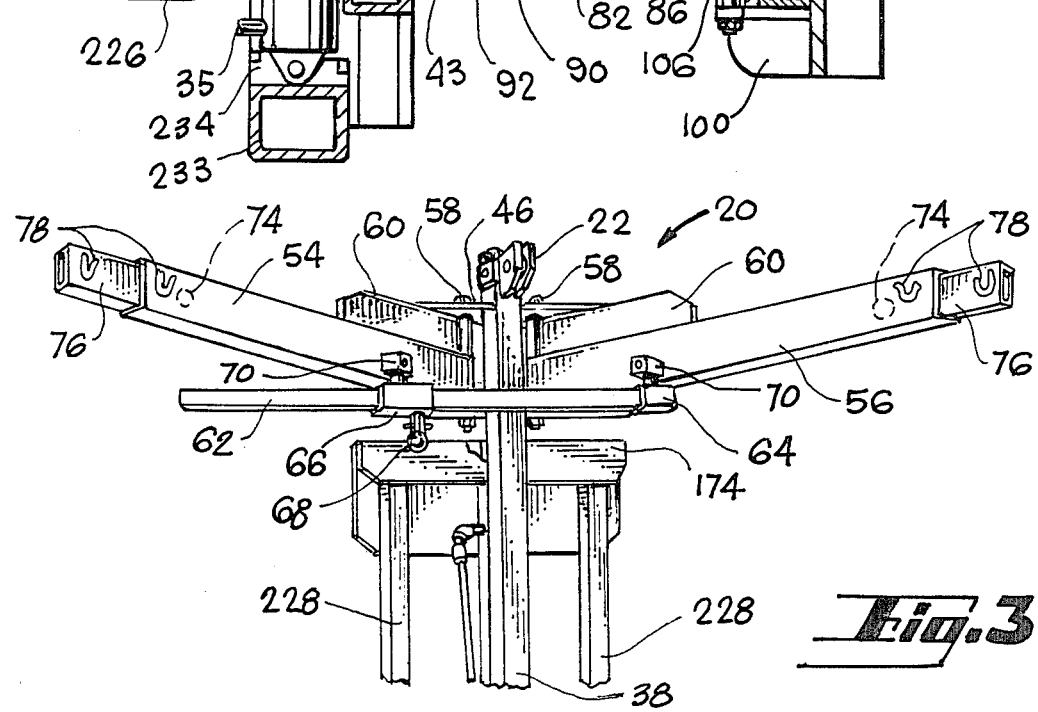
FIG. 3 is a partial front view of the towing apparatus of FIG. 1.

Referring to FIGS. 2 and 3 jointly, the boom assembly 20 includes a pair of boom arms 54 and 56. The boom arms are attached to the sleeve 46 at separate but closely adjacent pivot pins 58. The separate pivoting of the boom arms permits an extended radius of load guiding around a towing vehicle. A reinforcing steel web 60 increases the load capacity of the boom arms 54 and 56.

The boom assembly further includes a spreader arm 62 affixed to a steel tube member 64 fastened to the boom arm 56. The spreader arm 62 is slidably fit into a second tube member 66 suspended from the boom arm 54. A locking pin 68 fitted to the second tube member 66 is spring biased to penetrate any of a number of holes, not shown, in the underside of the spreader arm 62. The tube members 64 and 66 are pivotally attached to support blocks 70 so that the angle of the boom arms 54 and 56 relative to each other may be adjusted for a particular application Referring briefly to FIG. 4, the boom arms are first shown in a highway position 54 and 56. In the highway position the spreader arm 62 holds the boom arms 180 degrees apart, and away from any work being done by other assemblies of the towing apparatus 10. The boom arms 54' and 56' illustrate the arms being held at a 90 degree angle relative to each other by the spreader arm 62'. In changing the boom arms from a highway position to the position shown by arms 54' and 56', the boom arms are pivoted at pivot pins 58 in the direction of Arrows A. The boom arms may then be pivoted in the directions of Arrows B to a parallel position as shown by boom arms 54" and 56". The spreader arm 62" will lock the boom arms in the parallel position to secure a sheave 72. The sheave assembly will be described more fully below.

Referring again to FIGS. 2 and 3, boom arm extension members 76 are telescopically fit within the boom arms 54 and 56. The extension members 76 have a number of holes, not shown, on the external surfaces and headed pins 74 on the boom arms 54 and 56 will penetrate a hole to lock the extension members in a desired position. The boom assembly includes a plurality of chain hooks 78 for retension of towing and load bearing chains, not shown. As seen in FIG. 2, the boom arm extension members 76 may have belt binders 80 which are substantially identical to the belt binders that will be described below with reference to the bumper assembly. The function of the belt binders is to secure towing belts which may be employed in the towing of a vehicle or in the lifting of some other load.

Figure 5:
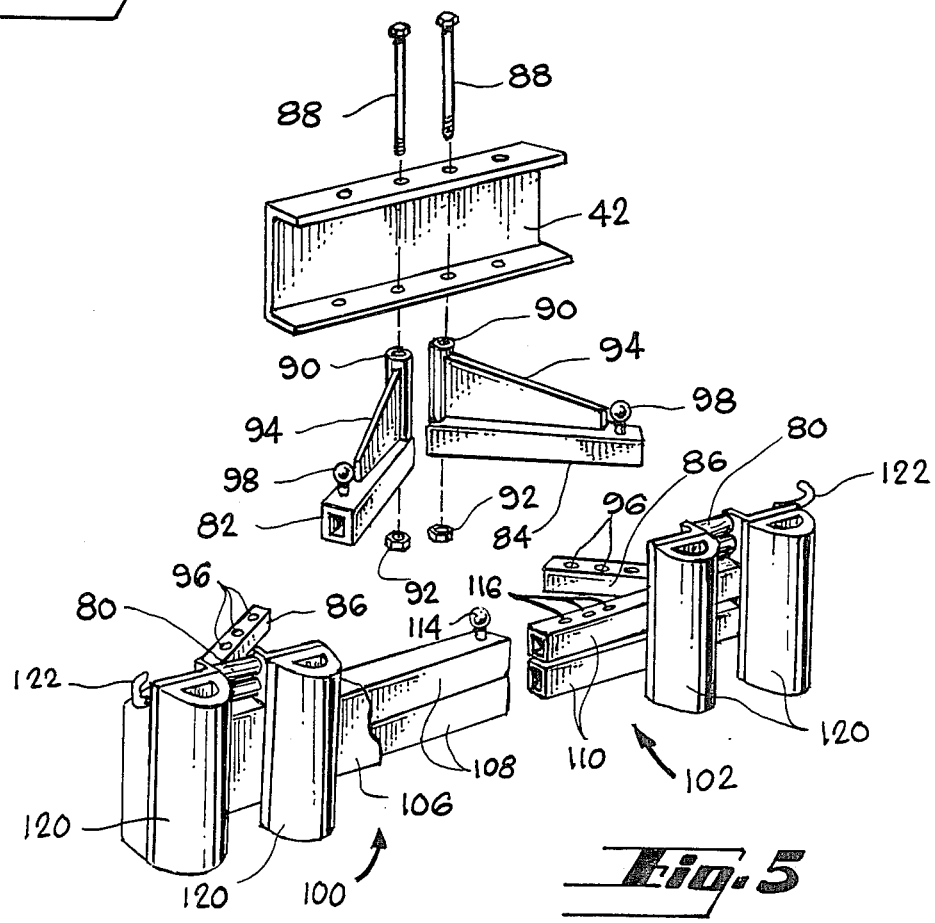
FIG. 5 is an exploded view of the bumper assembly of FIG. 1.

The bumper assembly 18 may be best seen in FIGS. 2 and 5. The bumper assembly has a pair of bumper support arms 82 and 84, each having a telescopically connected support arm extension member 86. The support arms 82 and 84 are attached to the C-shaped support bracket 42 at the inner ends of the support arms. Because the C-shaped support bracket 42 is secured to the mast 26 and also to the mounting member 38, extension of the piston rod 32 from hydraulic cylinder 28 provides vertical movement to the support arms 82 and 84 so as to raise the entire bumper assembly 18. The support arms are pivotally mounted to the C-shaped support bracket by insertion of pivot bolts 88 through tubes 90 at the inner ends of the support arms. Fastening nuts 92 secure the pivot bolts 88 to the assembly. Thus, the support arms 82 and 84 are mounted at separate but closely adjacent pivot points. Such a construction gives an extended radius of movement to the bumper assembly, thereby guiding the load around the towing vehicle during negotiation of a turn.

Steel webbing 94 is welded to the bumper support arms 82 and 84 to provide unitary, high-strength structural members. The support arms are rectangular hollow steel beams. Extension members 86 each have a plurality of holes 96 in an upper surface. The extension members are slidably fit with the support arms 82 and 84 and locking pins 98 penetrate the support arms and a selected hole 96 to allow varying degrees of extension.

Figure 7:
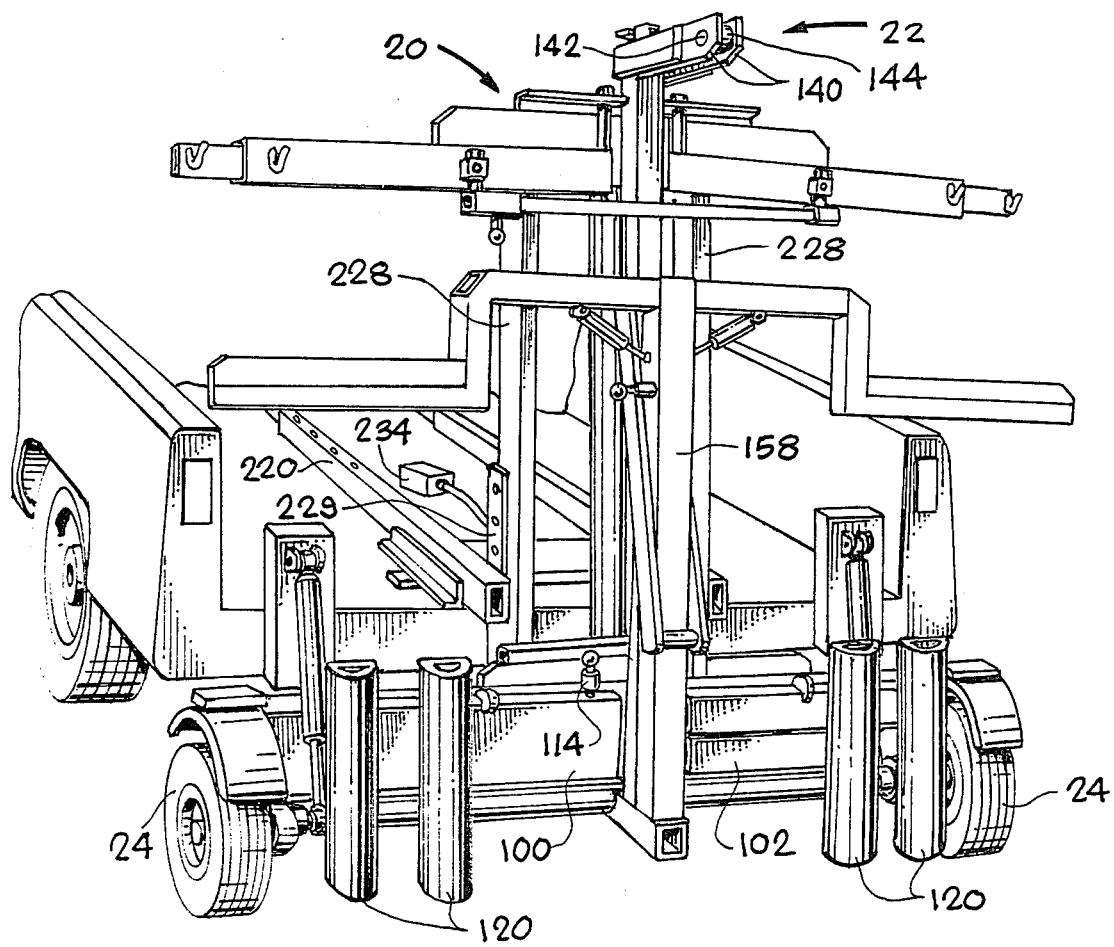
FIG. 7 is a front view of the present invention in a highway position.
Figure 6:
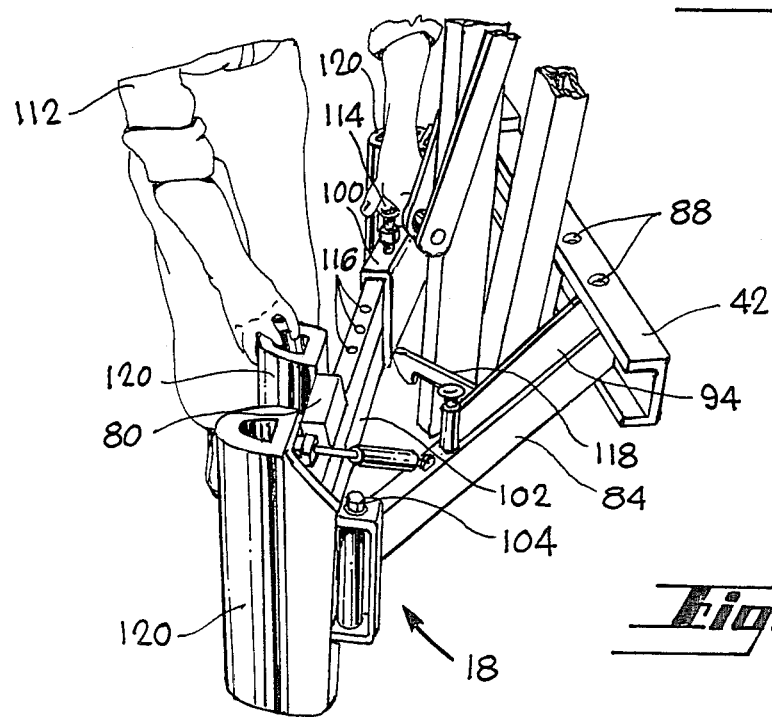
FIG. 6 is an elevational view of the bumper assembly of FIG. 5.

The support arm extension members 86 are each connected to a bumper member 100 and 102 by a pivot pin 104. The bumper member 100 has a rectangular tubing 106 which is partially cut away in FIG. 5 to expose two beam members 108. The bumper member 102 has a pair of beam members 110 which may be slidably fit into the beam members 108 of the bumper member 100. Referring now to FIGS. 5 and 6, an operator 112 may select the degree of extension of the bumper members 100 and 102 by means of a lock pin knob 114 which engages any of the holes 116 in the upper surface of the bumper member 102. When not in use, the bumper members 100 and 102 are decoupled and the bumper assembly is pivoted at pivot bolts 88 in the direction of the towing vehicle. The bumper assembly will thereby be folded into a highway position parallel the bumper of the towing vehicle. Latch 118 will secure the bumper member 102 in a highway position against the support arm 84. An identical latch, not shown, holds bumper member 100 against the support arm 82. FIG. 7 illustrates the bumper members 100 and 102 and the boom assembly 20 in a highway position.

FIGS. 5, 6 and 7 show the bumper mouldings 120 of the bumper members 100 and 102. A bumper of a disabled vehicle is secured to the bumper mouldings 120 during towing. The bumper mouldings prevent damage to the bumper of the disabled vehicle which would result from contact of metal against metal. Chain hooks 122 are used to secure chains extending from the apparatus to a disabled vehicle.

Figure 8:
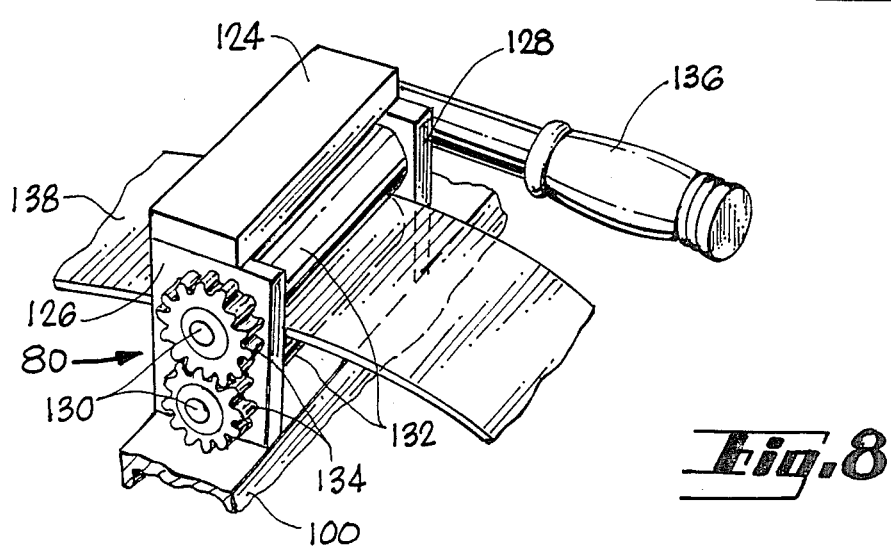
FIG. 8 is an expanded view of a belt binder of FIG. 5.

A disabled vehicle may be secured to the bumper assembly 18 by a J-hook attached to the end of a chain. However, to minimize the possibility of damaging the disabled vehicle, it is best to use belts rather than chains. Belts provide a more secure engagement and are less likely to scratch a vehicle. For this reason belt binders 80 are affixed to the bumper members 100 and 102. FIG. 8 is an enlarged view of a belt binder 80.

The belt binder 80 is housed in a frame having a top plate 124 and a pair of side plates 126 and 128. A pair of shafts 130 are journaled in the side plates 126 and 128. Eccentric, serrated rollers 132 are affixed to the shafts 130. The shafts 130 are mounted to meshing spur gears 134 for rotation with the gears. A handle 136 is fixed to rotate the upper shaft 130. In operation, the handle 136 is pivoted to separate the rollers 132 to permit insertion of a towing belt 138. The handle is then pivoted to a clamping position which brings the rollers 132 together tightly against the belt 138. The mass of the handle 136 provides sufficient force to maintain the rollers 132 in an engaging position for securement of a disabled vehicle.

FIG. 7 illustrates a single sheave assembly 22. The sheave 22 is removably mounted atop the towing apparatus by inserting a vertical tube member, not shown, into the mast rail 36. The sheave 22 as viewed in FIGS. 4 and 7, includes a pair of metal side plates 140 that support the shaft 142 upon which a pulley 144 rotates.

Figure 9:
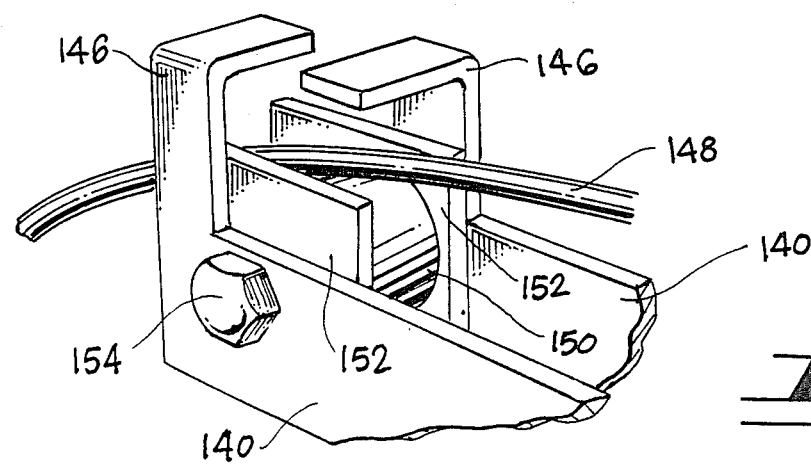
FIG. 9 is an expanded partial view of a sheave assembly within line 9 of FIG. 4.

FIG. 9 illustrates the rearmost portion of the sheave assembly 22. The side plates 140 are fixed to a pair of oppositely facing inverted L-shaped brackets 146 which are utilized to retain a winch cable 148 within the sheave assembly. Friction at the rearmost portion of the sheave assembly is minimized by means of a roll 150 disposed between two positioning members 152 and held to the side plates 140 by a bolt 154.

Figure 4:
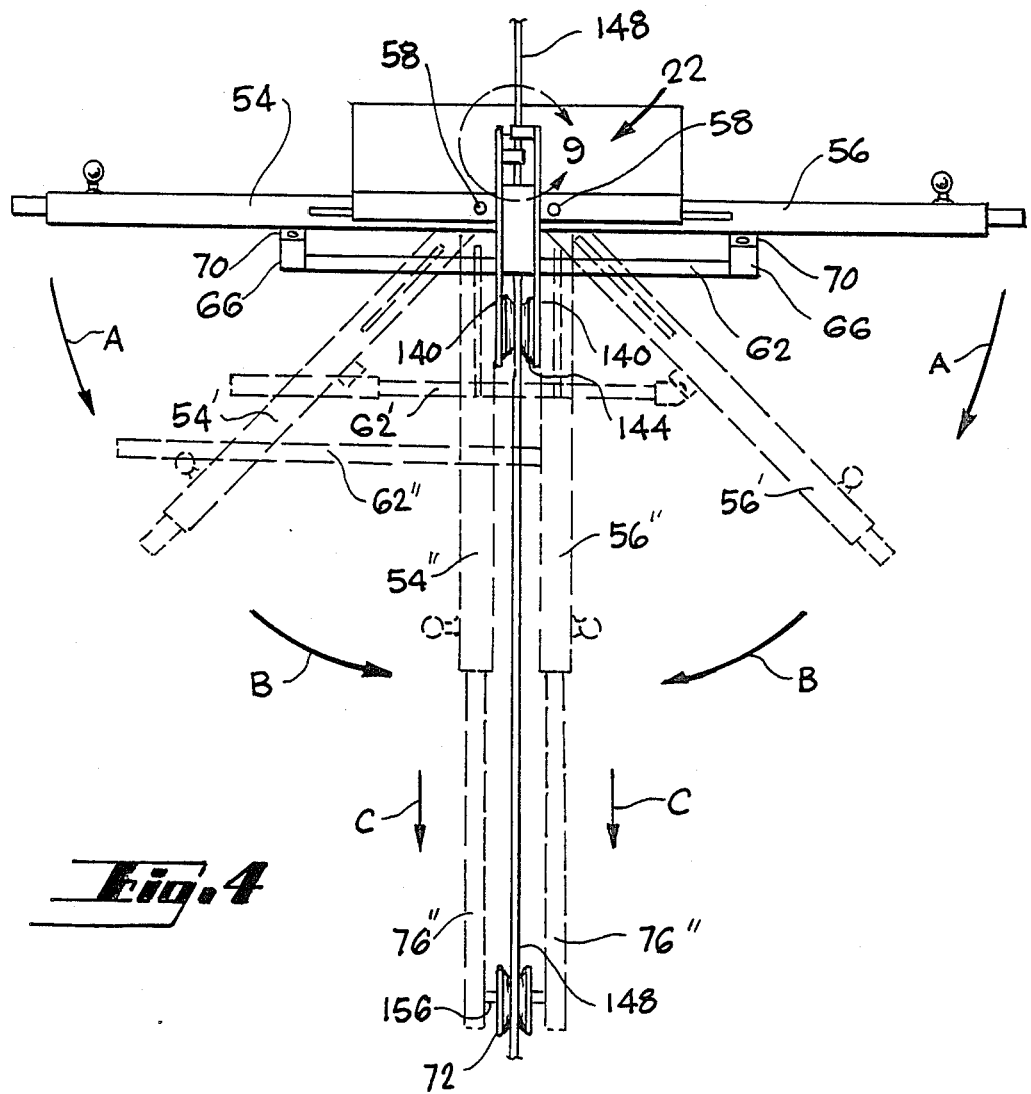
FIG. 4 is an elevational view of the apparatus of FIG. 3.

FIG. 4 shows the boom arms 54" and 56" brought to a parallel position and the boom arm extension members 76" extended in the direction of Arrows C so as to furnish a means for securing a second pulley 72. The second pulley is fit about a shaft 156 that is supported by the extension members. The double sheave affords greater leverage in recovering a stranded vehicle from a ditch, gully or the like.

Figure 10:
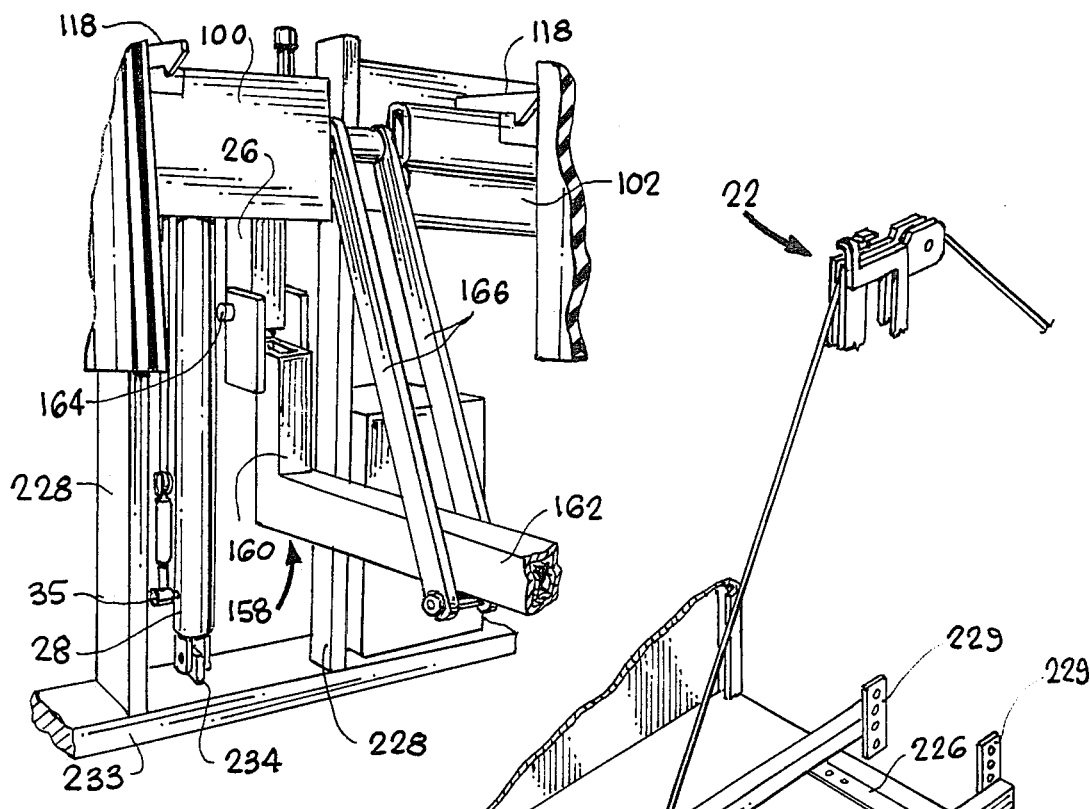
FIG. 10 is a partial front view of the wheel lift assembly of FIG. 1.

The wheel lift assembly 16 has a lift arm 158 having two hollow steel beam portions 160 and 162, as seen in FIG. 10. The first beam portion is mounted to the lower end of the mast 26 at a pivot point 164. The second beam portion 162 is at a right angle to the first beam portion 160. A crossbar 166 is welded at one end to the second beam portion 162

Figure 11:
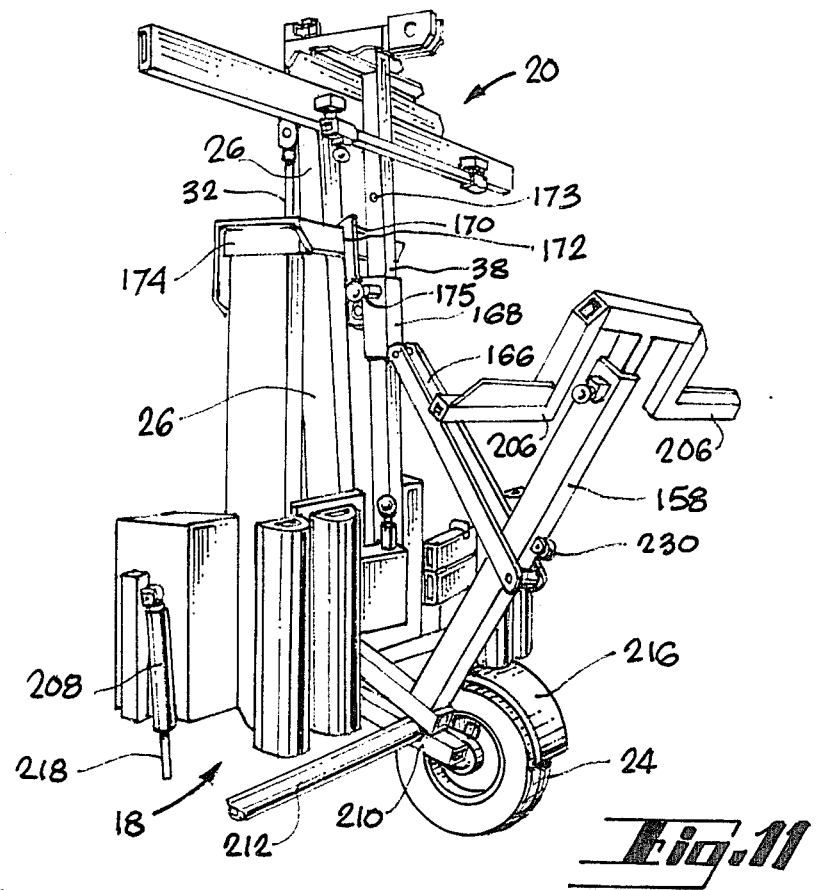
FIG. 11 is a perspective view of the wheel lift assembly of FIG. 1 in a partially folded position.

Referring now to FIGS. 10 and 11, the opposite end of the crossbar 166 is welded to a beam rider sleeve 168 which is slideably fit about the mounting member 38. The angle of the lift arm 158 relative to the ground is determined by the vertical movement of the sleeve 168 relative to the mast 26 and the mounting member 38. The vertical movement of the mounting member 38, upon which the sleeve 168 is fit, is coincident with the vertical movement of the mast. That is, as the mast is moved vertically by extension and retraction of the piston rod 32 from the hydraulic cylinder 28, the mounting member must necessarily follow. As will be shown in more detail immediately below, this means firstly that if the sleeve 168 is locked in position on the mounting member 38, the lift arm 158 cannot pivot at pivot point 164 and, secondly, that if the sleeve 168 is prevented from moving vertically while the mast 26 and the mounting member 38 are caused to be moved vertically, the lift arm 158 will pivot at pivot point 164.

Figure 12C:
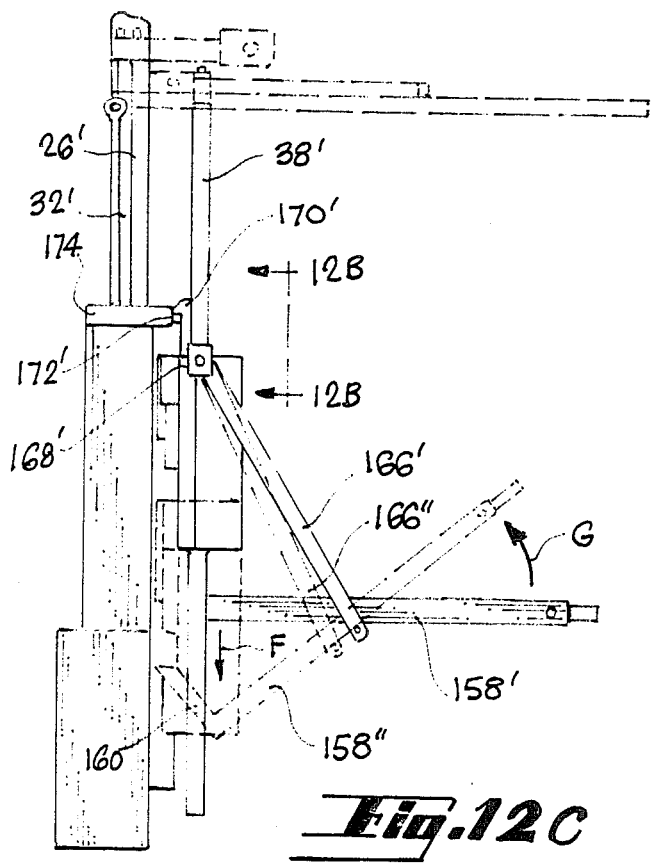
FIGS. 12A and 12C are side views of the wheel lift assembly of FIG. 11 in operation.
Figure 12B:
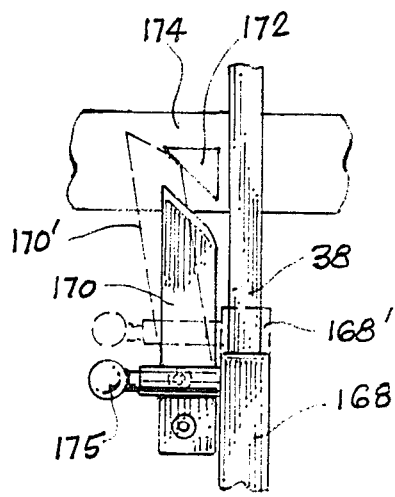
FIG. 12B is an expanded frontal view of the wheel lift assembly within line 12B of FIG. 12C.
Figure 12A:
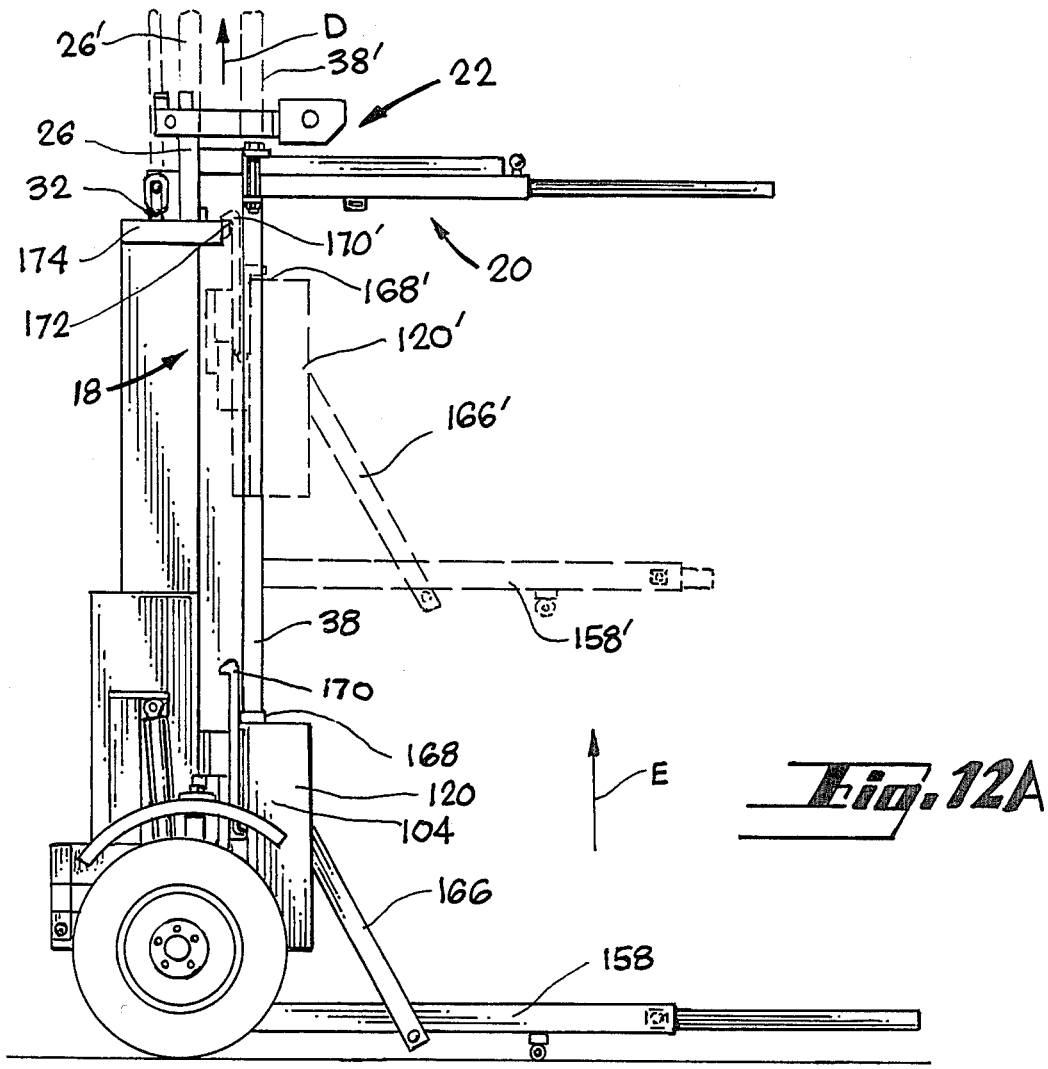

The pivoting of the lift arm 158 is best explained with reference to FIGS. 12A-12C. The lift arm 158 is shown in a horizontal towing position in FIG. 12A. When the piston rod 32 is extended from the main hydraulic cylinder, the mast 26 and the mounting member 38 are moved upwardly, as indicated by Arrows D and E. Because the lift arm 158 is attached to the mast 26 at the pivot point 164, the lift arm rises with the mast. Preferably, the sleeve 168 rests upon the foot plate 44 (shown in FIG. 2) so that the crossbar 166 will also provide a lifting force to the lift arm 158.

A lock latch 170 on the beam rider sleeve 168 is positioned to engage a triangular catch 172. The triangular catch 172 is affixed to a mast head 174 which houses the main hydraulic cylinder and through which the mast 26 extends. The mast head 174 remains stationary during vertical movement of the mast. As shown in FIG. 12B, the lock latch 170 is pivoted upon the sleeve 168 as the sleeve moves to a position 168'. This method of latching the sleeve 168 to the mast head 174 is not critical. What is critical is that the sleeve is prevented from moving downwardly after the sleeve and the lift arm have reached a position such as that shown by the sleeve 168' and the lift arm 158' of FIG. 12A. Thereafter, retraction of the piston rod 32 into the main hydraulic cylinder will cause the mast 26 and the mounting member 38 to descend. The bumper assembly and the boom assembly will likewise move downwardly. However, as shown in FIG. 12C, engagement of the latch lock 170' with the triangular catch 172' prevents the beam rider sleeve 168' from descending.

The inner end of the lift arm 158' is attached to the mast 26' so that the inner beam portion 160 of the lift arm is forced downwardly, as indicated by Arrow F, by movement of the mast. With the beam rider sleeve 168' locked in position with respect to downward movement of the mast, the crossbar 166' will cause the lift arm to pivot. At least initially the lift arm 158 will be pivoted in the direction of Arrow G to a tilted position such as lift arm 158". Further descent of the mast will pivot the lift arm into an upright highway position.

Referring briefly to FIG. 11, as the lift arm 158 is pivoted to an upright position, a hole 173 in the side of the mounting member 38 will be moved toward the end of a sleeve lock pin knob 175. The sleeve lock pin knob is spring biased to be received by the hole 173. Alignment of the hole 173 with the sleeve lock pin knob 175 will secure the sleeve 168 in position on the mounting member 38. In this manner the lift arm remains in the upright highway position when an operator wishes to utilize the bumper assembly or boom assembly to secure a vehicle or a load.

Figure 13A:
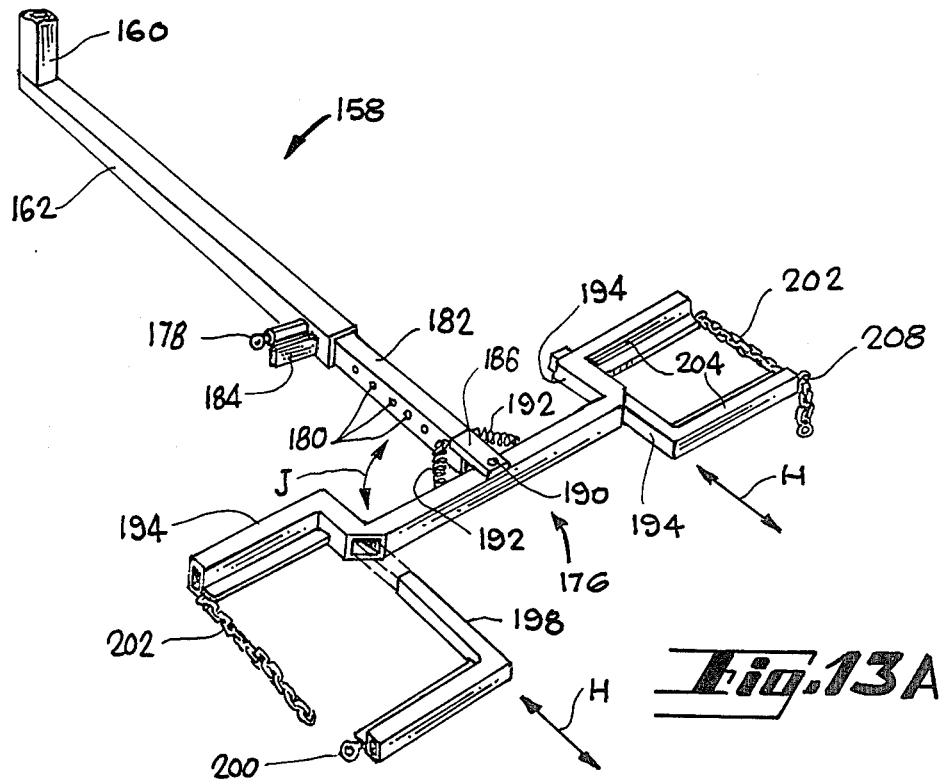
FIGS. 13A and 13B are top views of the lift arm of FIG. 1.
Figure 13B:
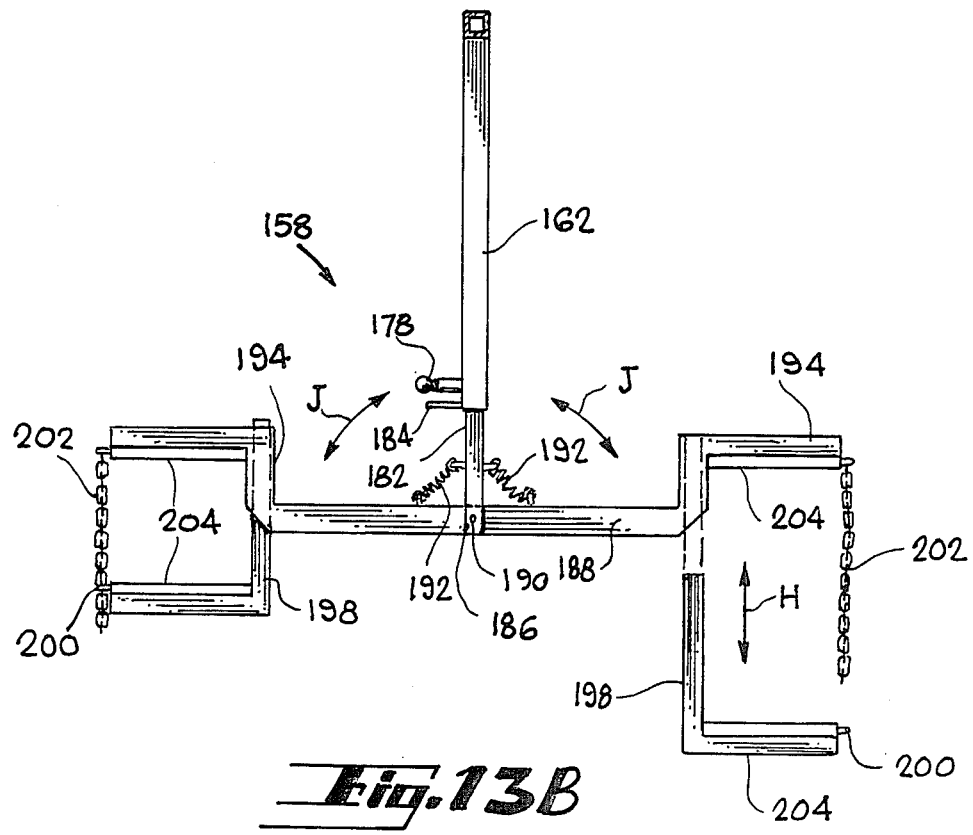

Referring now to FIGS. 13A and 13B, the lift arm 158 includes a wheel fork 176 telescopically attached to the beam portion 162. A lock pin knob 178 is spring biased to be received into a hole 180 along the length of an extension member 182 of the wheel fork. Thus the lift arm 158 may be selectively elongated for use in a particular application. A safety bracket 184 adjacent the lock pin knob 178 prevents inadvertant repositioning of the wheel fork 176.

A pivot bracket 186 connects a crossbeam 188 of the wheel fork 176 to the extension member 182. The crossbeam 188 will pivot at pivot point 190 but is urged into a perpendicular position, relative to the extension member 182, by springs 192. The opposed ends of the crossbeam each have a wheel cradle 194. Wheel retainers 198 and hooks 200 are inserted into the wheel cradles and locked in position with a chain 202 for selective elongation. Chain 202 and hook 200 permit repositioning of the wheel retainers 198 along the length of the wheel cradles 194 for cradling the wheels of vehicles of various wheel diameters.

Elbowed wheel retainers 198 are secured to the telescoping members of the wheel cradles 194. FIG. 13B shows elbowed wheel cradle arm 198 in a telescoped highway position. In operation, the lift arm 158 is lowered to a horizontal position and elbowed wheel retainers 198 are removed shown in FIG. 13B. The towing vehicle is then positioned so that the wheel cradles 194 are immediately in front of the wheels to be cradled, whereupon the elbowed wheel retainers 198 are inserted telescopically into wheel cradles 194 to the position shown in FIG. 13A. Chains 202 are employed to retain the elbowed wheel retainers in a towing position. Support plates 204 on each wheel cradle aid in supporting the wheels of a vehicle within the wheel cradles 194.

During towing of a disabled vehicle the crossbeam 188 may pivot at pivot point 190 so that the disabled vehicle will not fight a towing vehicle negotiating a turn. This pivoting is indicated by Arrows J. However, when the extension member 182 is retracted to the extreme position within the beam portion 162, the pivot bracket 186 will abut the end of beam portion 162 to prevent the crossbeam 188 from pivoting. The lack of crossbeam pivot is beneficial during lifting of an entire load such as a motorcycle or when the lift arm is positioned in an upright highway position.

Figure 14:
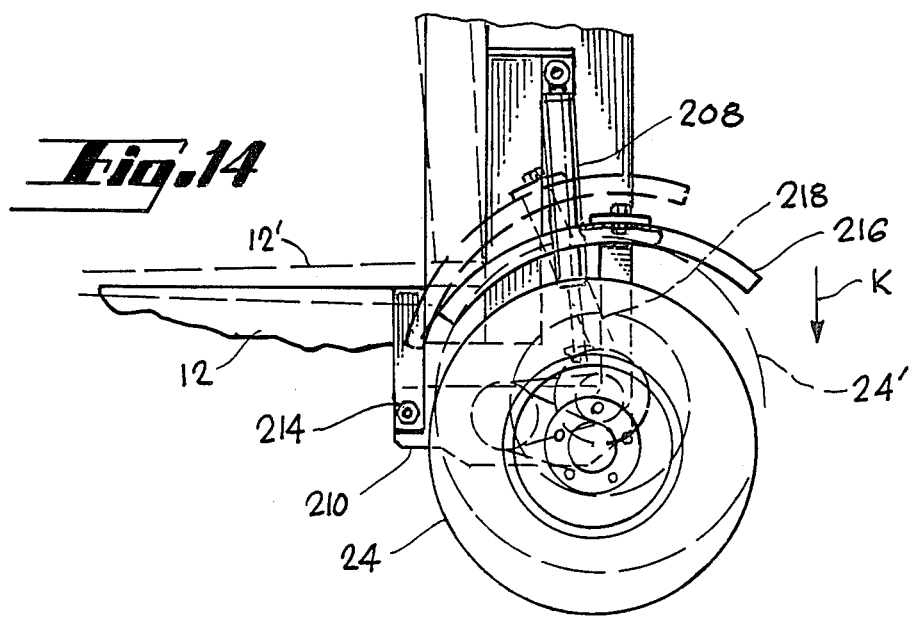
FIG. 14 is a side view of the stabilizer wheels of FIG. 1.

Referring now to FIGS. 11 and 14, the towing apparatus has a pair of stabilizer wheels 24 which may be raised and lowered by hydraulic cylinders 208. Each wheel is mounted to a support beam 210 that is attached to a base tube 212 at a pivot 214. The wheels 24 are framed by a fender 216. When the towing apparatus is not in use the piston rod 218 of the hydraulic cylinder 208 is retracted to retain the wheels 24' in a raised condition, approximately 10 inches above the ground. During use, however, the wheels 24 may be lowered, as indicated by Arrow K, to contact the ground. The piston rod 218 may be selectively elongated to exert a lifting force on the entire towing apparatus and back end of the towing vehicle 12. By lifting the back end to a position 12', the stabilizer wheels 24 eliminate towing vehicle light front ends that are normally associated with the towing of especially heavy loads. Thus, the wheels provide greater balance of the load and increased steering control.

Figure 15:
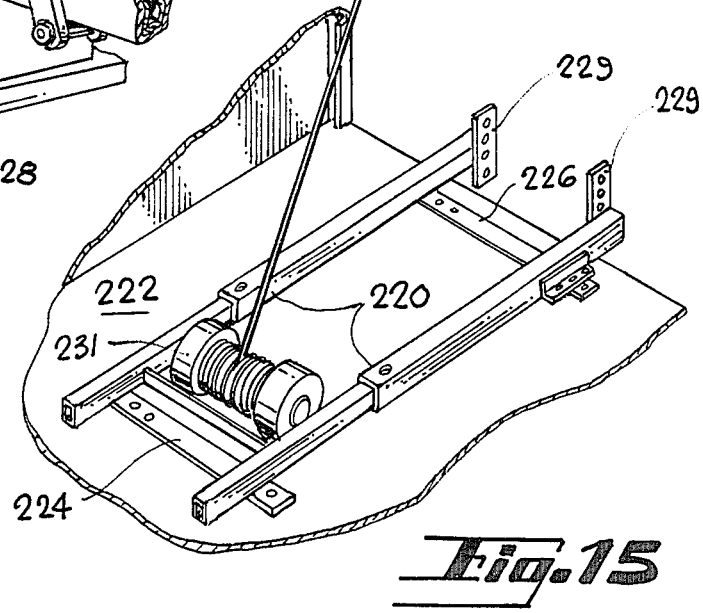
FIG. 15 is an elevational view of the mounting assembly of the towing apparatus of FIG. 1.

Referring now to FIGS. 7 and 15, in the installation of the towing apparatus, installation beams 220 are fastened to the bed 222 of a towing vehicle by brackets 224 and 226. The rear of each beam 220 is affixed to the rail members 228 by securing plates 229. As shown in FIG. 10, the vertical rail members 228 are secured at lower extremities to a horizontal bar 233. The main hydraulic cylinder 28 which supports the mast 26 at the upper end of the main hydraulic cylinder is supported at a lower end by attachment to the horizontal bar 233 at a lug 234. This coupling of the mast 26 to the horizontal bar and therefore also to the towing vehicle is best shown in FIG. 2, which also illustrates that with the mast 26 in place, the rail 36 is inserted into the mast and the mounting member 38, along with the bumper assembly, is attached to the C-shaped support bracket 42 by pivot bolts 88. Returning to FIG. 15, optionally a winch 331 may be installed in the bed of the truck 222 by attaching the winch to the installation beams 220.

In operation, the present invention affords a number of options in the towing of a disabled vehicle or the lifting of a load. FIG. 6 illustrates the bumper assembly 18. The bumper members 100 and 102 are selectively elongatable for securement to a disabled vehicle. Likewise, the bumper support arms 82 and 84 may be elongated to optimize the clearance between the towing vehicle and the disabled vehicle. The support arms are attached to the towing apparatus at separate but closely adjacent pivot points 88. The separate pivots permit an extended radius of vehicle swing during negotiation of turns. Moreover, the bumper members 100 and 102 may thus be detached and folded back against the bumper of a towing vehicle when the bumper assembly is not in use. Latches 118 will retain the bumper assembly in a folded highway position and will provide clearance for pivoting of the wheel lift assembly.

Referring to the drawings in general, but FIG. 11 particularly, the wheel lift assembly 16 is pivoted from an upright highway position to a horizontal towing position by urging the sleeve lock pin knob 175 away from the mounting member 38 while simultaneously extending the piston rod 32 from the main hydraulic cylinder. The hole 173 in the mounting member will thereby be moved from alignment with the sleeve lock pin knob 175. After this misalignment has occurred the lock pin knob may be released. Because gravitational pull will prevent the sleeve 168 from rising with further extension of the piston rod 32, upward movement of the mast 26 will cause the lift arm 158 to pivot at the pivot point which joins the lift arm to the mast.

When the wheel lift assembly has reached a horizontal towing position further upward movement of the mast 26 will lift the lock latch 170 from the triangular catch 172. The lock latch 170 may then be pivoted away from the catch 172 while the piston rod 32 is retracted into the main hydraulic cylinder. Preferably, a spring actuated handle, not shown, is furnished to facilitate pivoting of the lock latch. After the lock latch has cleared the triangular catch 172, the lock latch may be released. The lift arm will thus be lowered while still in a horizontal towing position until a dolly wheel 230 reaches the ground. In actuality, the lift arm is not horizontal but instead has a slight angle of decline as measured from the towing vehicle. This angle of decline and the dolly wheel 230 may be critical to the positioning of the lift arm for lifting of a vehicle having a low bumper clearance or a front end spoiler.

With the lift arm 158 properly positioned in front of a disabled vehicle, elbowed wheel retainers 198 are inserted telescopically to frame the tires of the disabled vehicle. Chains are employed to secure the cradle arms. Preferably, safety chains and wheel tie-down straps, not shown, are utilized to secure the vehicle and to prevent the vehicle from jumping the forks. The wheel lift assembly may then be hydraulically raised to the desired height. The stabilizer wheels 24 are positionable for load leveling, as needed.

The boom assembly 20 may be used in conjunction with the wheel lift assembly for towing of a vehicle. Belt binders 80 secured to the boom arm extension members 76 may be attached to the wheel cradles 194 of the lift arm 158 for the towing of buses and other large vehicles. Alternatively, for the lifting of unusual loads, such as motorcycles, the load may be lifted from the bottom by the wheel lift assembly and supported from the top by the boom assembly.

In returning the wheel lift assembly to a highway position, the piston rod 32 is first expanded until the latch lock 170 engages the triangular catch 172. The piston rod is then retracted to pivot the lift arm. When the lift arm reaches its upright highway position the hole 173 in the mounting member 38 will slide into position for alignment with the lock pin knob 175 to lock the lift arm. The boom assembly 20 may then be utilized for the lifting of a load. The boom assembly has a rated capacity of 4,000 pounds and may be raised to a height of nine feet.

Referring to FIG. 7, the main hydraulic cylinder 28 is actuated by a hand control 234 which initiates fluid flow through a fitting 35 shown in FIG. 10, threaded into the main hydraulic cylinder 28. The hand control also actuates hydraulic cylinders associated with the stabilizer wheels 24.

We claim:

1. A vehicle towing apparatus for attachment to a towing vehicle comprising,
   an upright member having a first end coupled to a towing vehicle,
   power means for providing vertical movement to said upright member,
   a bumper assembly having a pair of bumper members and having a pair of bumper support arms in communication with said upright member for vertical movement therewith, each bumper member having a first end and a second end, each bumper support arm being connected to a first end of a bumper member and having a separate pivot connection for communication with said upright member, said bumper assembly having a means for selectively connecting said second ends of said bumper members and having a bumper towing means,
   a wheel lift having a lift arm pivotally attached to said upright member, said lift arm having a towing means for supporting the wheels of a vehicle to be towed, and
   means for selectively pivoting said lift arm from a road proximity position to a road clearing towing position.

2. The towing apparatus of claim 1 wherein said means for selectively pivoting said lift arm includes an elongated mounting member and a sleeve slidably fit about said mounting member, said mounting member being fixed to said upright member for vertical movement therewith, said sleeve having a crossbar diagonally extending to said lift arm and a means for locking said sleeve in position relative to a random horizontal plane, thereby causing said lift arm to pivot.

3. The towing apparatus of claim 2 wherein said sleeve has a locking pin means for positionally locking said sleeve to said mounting member.

4. The towing apparatus of claim 1 wherein said towing means of said wheel lift includes a pair of wheel cradles extending from said lift arm and disposed to receive the wheels of a vehicle to be towed.

5. The towing apparatus of claim 1 wherein said bumper members, said bumper support arms and said lift arm each have a means for being telescopically elongated.

6. The towing apparatus of claim 1 further comprising a boom assembly having a pair of boom arms, each boom arm being in communication with said upright member at a separate pivot near said free end for rotation about a vertical axis.

7. The towing apparatus of claim 1 further comprising a sheave assembly mounted atop said upright member.

8. The towing assembly of claim 1 further comprising a pair of pneumatic stabilizer tires and power means for vertically extending said stabilizer tires.

9. A vehicle towing apparatus to be fitted onto a towing vehicle comprising,
   an upright member having a first end coupled to a towing vehicle,
   power means for vertical reciprocation of said upright member,
   a wheel lift assembly having a lift arm pivotally attached to said upright member at a first pivot point, said lift arm having a first towing means for securing a vehicle to be towed and having a substantially road clearing towing position and a road proximity position, and a lift arm pivot means having an elongated mounting member affixed parallel said upright member for vertical movement therewith and having a sleeve slidably fit about said mounting member, said wheel lift assembly having a crossbar extending from said lift arm for attachment to said sleeve, said sleeve having a means for releasably locking said sleeve in place relative to a horizontal plane, thereby causing said crossbar to pivot said lift arm at said first pivot point upon movement of said upright member.

10. The towing apparatus of claim 9 wherein said means for releasably locking said sleeve includes a lock latch affixed to said sleeve and disposed to support the sleeve when engaged with a stationary catch.

11. The towing apparatus of claim 9 wherein said sleeve has a locking member extending perpendicularly from said sleeve and biased into contact with said mounting member, said mounting member having a bore disposed to receive said locking member.

12. The towing apparatus of claim 9 wherein said first towing means includes a pair of wheel cradles fixed to said lift arm and disposed to receive the wheels of a vehicle to be towed.

13. The towing apparatus of claim 9 further comprising a bumper assembly having a pair of bumper support arms, each having an inner end in communication with said upright member at a separate pivot, said bumper assembly having a bumper supported at opposed ends by said bumper support arms and having telescopically separable first and second bumper members, said bumper having a second towing means for securing a vehicle.

14. The towing assembly of claim 9 further comprising a boom assembly fixed to said mounting member, said boom assembly having a pair of telescopically elongatable boom arms, each having a first end fixed to said mounting member at a separate pivot, said boom assembly having a towing means for securing a vehicle to be towed.

15. The towing apparatus of claim 9 further comprising a pair of vertically extendable stabilizer tires attached to said means for affixing said upright member to a towing vehicle, said towing apparatus having a means for selective elevation of said tires.

* * * * *